US012010251B2

(12) United States Patent
He et al.

(10) Patent No.: US 12,010,251 B2
(45) Date of Patent: Jun. 11, 2024

(54) ELECTRIC BORDER GATEWAY DEVICE AND METHOD FOR CHAINING AND STORAGE OF SENSING DATA BASED ON THE SAME

(71) Applicant: Jiangsu Zhirong Energy Technology Co., Ltd., Nanjing (CN)

(72) Inventors: Yuan He, Nanjing (CN); Hui Liu, Nanjing (CN); Yan Wang, Nanjing (CN); Yao Sun, Nanjing (CN)

(73) Assignee: Jiangsu Zhirong Energy Technology Co., Ltd., Nanjing (CN)

( * ) Notice: Subject to any disclaimer, the term of this patent is extended or adjusted under 35 U.S.C. 154(b) by 0 days.

(21) Appl. No.: 17/281,851

(22) PCT Filed: Dec. 18, 2020

(86) PCT No.: PCT/CN2020/137531
§ 371 (c)(1),
(2) Date: Mar. 31, 2021

(87) PCT Pub. No.: WO2021/203733
PCT Pub. Date: Oct. 14, 2021

(65) Prior Publication Data
US 2023/0017740 A1    Jan. 19, 2023

(30) Foreign Application Priority Data

Apr. 7, 2020    (CN) .......................... 202010264956.8

(51) Int. Cl.
*H04L 9/00*    (2022.01)
*H04L 9/06*    (2006.01)
(Continued)

(52) U.S. Cl.
CPC .............. *H04L 9/50* (2022.05); *H04L 9/0643* (2013.01); *H04L 45/04* (2013.01); *H04L 67/133* (2022.05); *H04L 2209/463* (2013.01)

(58) Field of Classification Search
CPC ......... H04L 9/50; H04L 9/0643; H04L 45/04; H04L 67/133; H04L 2209/463;
(Continued)

(56) References Cited

U.S. PATENT DOCUMENTS

2011/0090041 A1*    4/2011    Naden .................. G01S 5/0027
340/3.1
2017/0257733 A1*    9/2017    Arneson ............... H04W 12/50
(Continued)

FOREIGN PATENT DOCUMENTS

CN    109495516    3/2019
CN    110086821    8/2019
(Continued)

*Primary Examiner* — Taghi T Arani
*Assistant Examiner* — Blake I Narramore
(74) *Attorney, Agent, or Firm* — Bayramoglu Law Offices LLC

(57) ABSTRACT

The present disclosure discloses an electric border gateway device which adopts the blockchain technology to implement communication authentication and data transmission encryption at the gateway. As a device for sinking and processing local information, the border gateway device may build not only a local blockchain network with a variety of local electric sensing terminal devices, but also a regional blockchain network with other border gateways and electric management platforms. As a critical node of these two types of blockchain, the border gateway may enable the authentication of identity legality between electric sensing terminal devices, the critical data storage in the blockchain ledger, the deployment and implementation of blockchain transaction by control and coordinated functions, and the safe and reliable data interaction. The present disclosure also dis-
(Continued)

closes a method for chaining and storage of sensing data based on the electric border gateway device.

1 Claim, 2 Drawing Sheets

(51) Int. Cl.
*H04L 45/02* (2022.01)
*H04L 67/133* (2022.01)
(58) Field of Classification Search
CPC . H04L 9/3247; H04L 63/0869; H04L 9/0825; H04L 9/0861; H04L 9/3252; H04L 63/0442; Y04S 40/20; G06F 16/27
See application file for complete search history.

(56) References Cited

U.S. PATENT DOCUMENTS

| | | | |
|---|---|---|---|
| 2017/0366348 A1* | 12/2017 | Weimer | H04L 9/3236 |
| 2017/0372600 A1* | 12/2017 | Palin | H04W 4/80 |
| 2018/0005186 A1* | 1/2018 | Hunn | G06F 16/93 |
| 2018/0117447 A1* | 5/2018 | Tran | G06Q 20/382 |
| 2018/0157535 A1* | 6/2018 | Dushok | G06F 11/3433 |
| 2018/0176008 A1* | 6/2018 | Tsuyuzaki | H04L 9/0852 |
| 2018/0295546 A1* | 10/2018 | Crawford | H04L 67/148 |
| 2019/0036678 A1* | 1/2019 | Ahmed | H04L 9/302 |
| 2019/0097793 A1* | 3/2019 | Nix | H04L 63/0272 |
| 2019/0098494 A1* | 3/2019 | Pry | H04W 12/068 |
| 2019/0167902 A1* | 6/2019 | Kamen | A61M 5/14244 |
| 2019/0213182 A1* | 7/2019 | Rapanen | H04L 63/0245 |
| 2019/0229924 A1* | 7/2019 | Chhabra | H04L 9/0637 |
| 2019/0349762 A1* | 11/2019 | Bang | H04L 9/0897 |
| 2020/0271450 A1* | 8/2020 | Gorur Sheshagiri | G06F 1/163 |

FOREIGN PATENT DOCUMENTS

| | | |
|---|---|---|
| CN | 110147668 | 8/2019 |
| CN | 110505227 | 11/2019 |
| CN | 111478902 | 7/2020 |

\* cited by examiner

ELECTRIC BORDER GATEWAY DEVICE AND METHOD FOR CHAINING AND STORAGE OF SENSING DATA BASED ON THE SAME

CROSS REFERENCE TO RELATED APPLICATIONS

The present disclosure claims the priority of the Chinese patent application titled "electric border gateway device and method for chaining and storage of sensing data based on the same" and filed to CNIPA (National Intellectual Property Administration of PRC) on Apr. 7, 2020 with the application number of 202010264956.8, which is entirely incorporated herein by reference.

TECHNICAL FIELD

The present disclosure relates to the scientific field of electric engineering, in particular to an electric border gateway device and method for chaining and storage of sensing data based on the same.

BACKGROUND

With the effective integration of new-generation information and communication technologies (such as Internet of Things and Internet) with smart grids, traditional power grids have to transform into a bilateral interactive service mode of the smart grid step by step. The electric management department may timely grasp and understand many things like operations of electric facilities, device failures and environmental information with the help of smart terminals, so as to properly arrange the electric operations and maintenance. Compared with traditional power grids, the new smart grid are characterized by heterogeneous communication networks, ubiquitous network security protection boundaries, diversified business security access requirements, and so on, which also increase a series of security risks such as electric information leakage, illegal device access, and device management out of control, rises the electric information security difficulty in heterogeneous networks, thereby resulting in the significantly increasing difficulty of vulnerability discovery, integrity protection, confidentiality protection, and attack defense for electric data, and put forward stricter requirements for different kinds of smart terminal access methods, local data processing capabilities, real-time coordinated control, and device and information security protection.

Nowadays, a large number of electric monitoring and sensing devices have been widely used in electric monitoring fields such as electric transmission, transformation, and distribution. Construction schemes of these monitoring systems generally upload the sensing data obtained by massive sensors through the border gateway and eventually to the server of the cloud platform via the access controller of the network layer. Since the border gateway is used as the sink node and processing device of sensing data, critical problems to be solved for current applications of the smart grid include: the access identity authentication and data communication security at Internet of Things (IoT) terminal devices, and the data communication security between the border gateway and the cloud platform.

In terms of device security, as data rises in value, an electric IoT terminal device will become a potential target for malicious attacks by hackers; while in terms of information security, streaming data in the electric IoT, especially when transmitted via a wireless network, is extremely susceptible to be stolen. In addition, with the integration of big data and IoT, massive data is stored in a few central nodes and, as a result, lacks backup and fails to guarantee the security thereof. In terms of user privacy and security, traditional IoTs are not capable of application-based privacy protection such as resistance to the key sharing attack. For the security of electric sensing and monitoring system, it requires to deal with many problems that whether GPS positioning systems of various sensors in the IoT of electric devices can keep the private data of users completely confidential or not, and whether the information is monitored by manufacturers or not.

At present, the electric border gateway generally implements the device authentication and communication encryption by using a software encryption algorithm which, however, has certain requirements for device resources; besides, an electric sensing terminal device is often a device limited in resource, so an encryption algorithm with high complexity is generally not suitable for the communication security between the border gateway and the sensing device. Some other electric transmission border gateways implement the encryption of device authentication and data communication by adding additional hardware encryption means such as security encryption chips or security devices. However, hardware encryption increases device overheads and electric consumption, and is not suitable for sensing terminal devices as well.

SUMMARY

Technical problems to be solved by the present disclosure is to overcome shortcomings of the prior art and provide an electric border gateway device and method for chaining and storage of sensing data based on the same. By adopting the electric border gateway in this scheme, the device may be used as a node of an electric sensing data storage blockchain, enabling mutual identity authentication with other nodes on the chain (sensing devices, sink nodes, other border gateways, cloud platforms) to allow identity verification among the devices, thereby establishing a trust relationship for implementing subsequent functions such as the data interaction behavior.

A technical scheme adopted in the present disclosure to solve the above mentioned problems is as follows:

The electric border gateway device provided in this scheme includes a communication module supporting various wired and wireless communication modes, a sensing data acquisition module, a data exchange module, a sensing device control module, and a blockchain processing module; wherein the communication module is connected with the blockchain processing module which is respectively connected with the sensing data acquisition module, the data exchange module, and the sensing device control module; wherein the blockchain processing module includes a data acquisition and processing unit, a device control processing unit, a data storage and processing unit, a local intelligent processing unit, and an encryption module; and wherein:

The communication module is used for transmitting the communication data sent by an external device to the blockchain processing module;

The blockchain processing module is used for implementing security authentication and communication data decryption of the external device;

The sensing data acquisition module is used for acquiring information of the sensing terminal device and outputting sensing data to the data acquisition and processing unit and the local intelligent processing unit;

The data acquisition and processing unit is used for outputting the sensing data transmitted by the sensing data acquisition module to the encryption module for data encryption and decryption, and outputting the encrypted/decrypted data to the data acquisition and processing unit and the device control processing unit; the data acquisition and processing unit analyzes the data according to a format of the sensing data, and outputs the analyzed data to the communication module and the data storage and processing unit;

The data exchange module is in charge of the data interaction with the blockchain processing module, which docks a remote procedure call RPC of a main chain of the blockchain and an application program interface API of the IoT device;

The sensing device control module is used for receiving operation and control instructions sent by the sensing terminal device, and executing corresponding operations;

The device control processing unit is directly connected with the sensing device control module, and is used for performing device authentication and device signature processing on an external access slave device or a slave device output by the sensing device control module; it is also in charge of parsing the encrypted/decrypted data into control instructions to implement the control of external devices;

The local intelligent processing unit is used for processes of data filtering, data classification and data fusion of the sensing data output by the sensing data acquisition module;

The data storage and processing unit is used for enabling data storage by adopting a blockchain hyperledger structure for the data transmitted by the data acquisition and processing unit;

The encryption module is used for storing private keys and data of all other slave devices in a gateway trust domain, and storing public keys of all authorized users in an encrypted storage medium through an encryption chip; it is also in charge of data signature, data encryption and signature verification of the slave device connected with the gateway.

As a further optimization scheme of the electric border gateway device according to the present disclosure, a border computing and processing module is also included, wherein the local intelligent processing unit outputs the fused data to the border computing and processing module, and the border computing and processing module is used for border computing and processing of the data transmitted by the local intelligent processing unit.

Based on the method for chaining and storage of sensing data of the electric border gateway device described as above, in a device on the electric sensing data blockchain, only the border gateway device is used as the master device for storing an aggregated electric sensing data ledger while other slave devices are involved only in the blockchain identity verification to verify the chaining application legality of the block, and adopt the PBFT consensus mechanism to synchronize the data to be chained into the electric sensing data blockchain, including steps as follows:

In Step 1: After sorting and organizing the sensing data received from the chain, the master device generates a block, fills the data into the block, adds its own signature and hash of the block, and broadcasts the block to the electric sensing data blockchain network;

In Step 2: After receiving the new block from the master device, the slave device adds a block header contained in the block to a latest block ledger of its own (which means adding a block record), performs hash audit on the block, and broadcasts the verification result information to the electric sensing data blockchain if the resultant hash is consistent with that sent by the master device;

In Step 3: each device also receives verification results from other nodes while verifying the block broadcast by the master node, deems the block to be valid after collecting messages confirming the correctness sent by other nodes on more than half of all devices, and submits the block to the locally owned ledger of the electric sensing data blockchain;

So far, all devices have completed the ledger synchronization of electric sensing data.

In comparison to the prior art, the above technical schemes adopted by the present disclosure provide the following technical effects:

(1) According to the present disclosure, the blockchain technology is adopted to implement the device communication authentication and data transmission encryption; wherein the device can establish electric sensing device authentication, data transmission, and data storage blockchain with electric sensing devices, sink nodes, other border gateways and cloud platforms. With the help of tamper proof and traceability of the blockchain, critical data that identifies the device legality will be stored, by way of a blockchain transaction, in the blockchain ledger maintained together by multiple distributed blockchain nodes, but not generated and managed by a certain trusted third party;

(2) By adopting the electric border gateway in this scheme, the device may be used as a node of an electric sensing data storage blockchain, enabling mutual identity authentication with other nodes on the chain (sensing devices, sink nodes, other border gateways, cloud platforms) to allow identity verification among the devices, thereby establishing a trust relationship for implementing subsequent functions such as the data interaction behavior; various kinds of monitoring data sink into the border gateway device, and the border computing technology is adopted to enable local processing of the monitoring data and implement functions such as the running status monitoring of station building device, fault warning, fault alarm and coordinated control, thereby finally realizing the self-healing of distribution station building.

DETAILED DESCRIPTION

Technical schemes in the present disclosure will be further described with reference to figures below:

In the following description, specific details, such as specific internal programs and techniques, are set forth for the purpose of illustration without limitation, so as to help thoroughly understand the embodiments of the present disclosure. However, those skilled in the art should understand that the present disclosure may be implemented in other embodiments without these specific details. In other cases, detailed descriptions of well-known systems, devices, circuits, and methods are omitted so as not to obscure the description of the present disclosure due to unnecessary details.

1, Hierarchical Structure of Electric Blockchain Monitoring System

Figure 1:
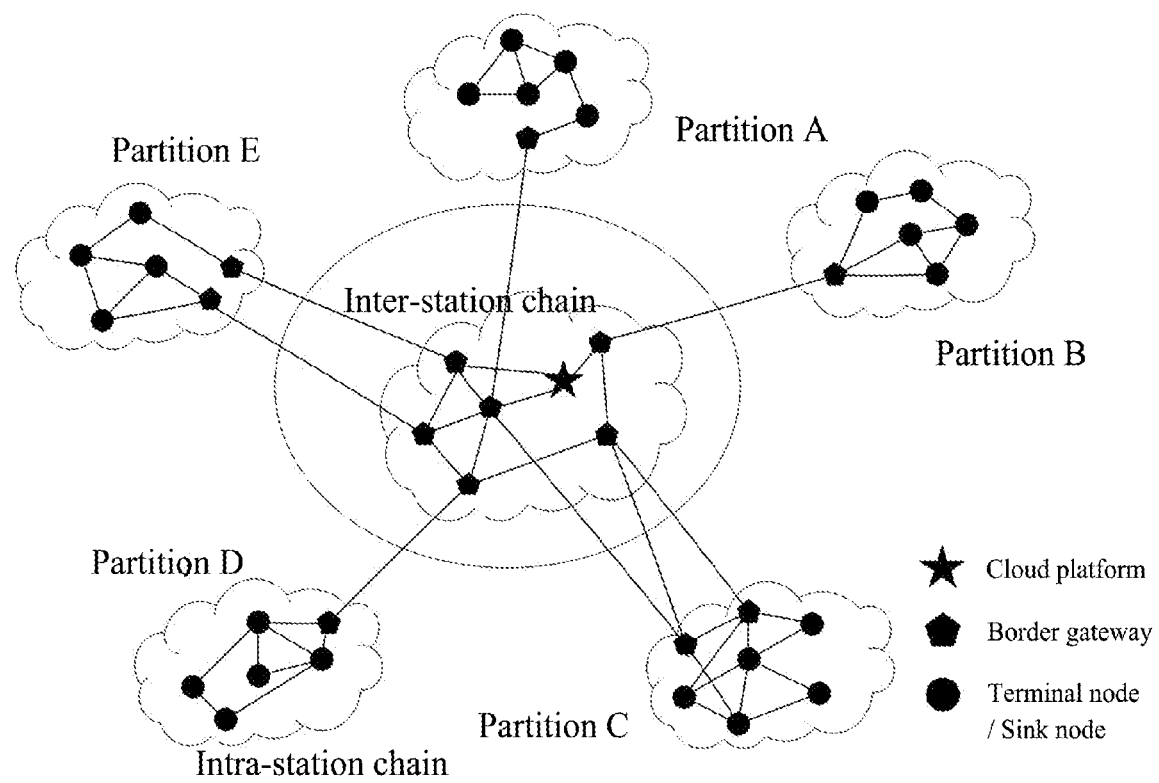
FIG. 1 is a hierarchical structure diagram of the electric blockchain system.

As a critical core device of the electric monitoring system, the electric border gateway (hereinafter referred to as gateway) device can enable not only all-round monitoring and data localization of information of the power distribution station building, but also the reliable transmission and safe storage of electric sensing information by acting as a critical node of hierarchical blockchain. The structure diagram of the electric blockchain monitoring system is as shown in FIG. 1. The system adopts a two-parallel-layer blockchain structure, wherein intra-station blockchains are adopted in different partitions and an inter-station blockchain structure is adopted between different partitions.

In the station building, an electric sensing data blockchain system in a small area is composed of an electric sensing terminal device or sink node and a gateway device. In this system, the gateway is the master device of a blockchain transaction, and the sensing terminal device or sink node is the slave device. A blockchain trust domain is constructed by the master device, and the slave device in the trust domain is the sensor terminal device or sink node in the communication area of the border gateway.

Among station buildings, a large-scale electric information management blockchain system is composed of a gateway or border proxy device and a remote management platform. In this large-scale blockchain system, the remote management platform acts as the master device and the gateway device acts as the slave device. The trust domain is constructed by the master device, and the new gateway device acts as the slave device that applies for association with the trust domain. The application services running on the remote management platform may provide various kinds of electric information monitoring data for the monitoring center and the operation and maintenance staff, for example, information inquiry, operation and maintenance, troubleshooting and inquiry services provided by the management platform may be used through mobile APPs with the help of the operation and maintenance staff.

2, Structure of Gateway Device

Gateway acts as the sink node and the access node in the sensing layer of the ubiquitous IoT of electric devices, and it also serves as the access controller and access device in the network layer. In addition to data access, local information processing and border computing functions, the gateway device also includes the blockchain function. In addition to terminal access management, the transaction management function is also necessary to the blockchain function, which is in charge of forwarding transactions initiated by terminals in the network, verifying the legality of new transactions in the ledger and maintaining the unified ledger. Therefore, the gateway is objectively required to have a computing ability to a certain degree, and a large storage space.

Figure 2:
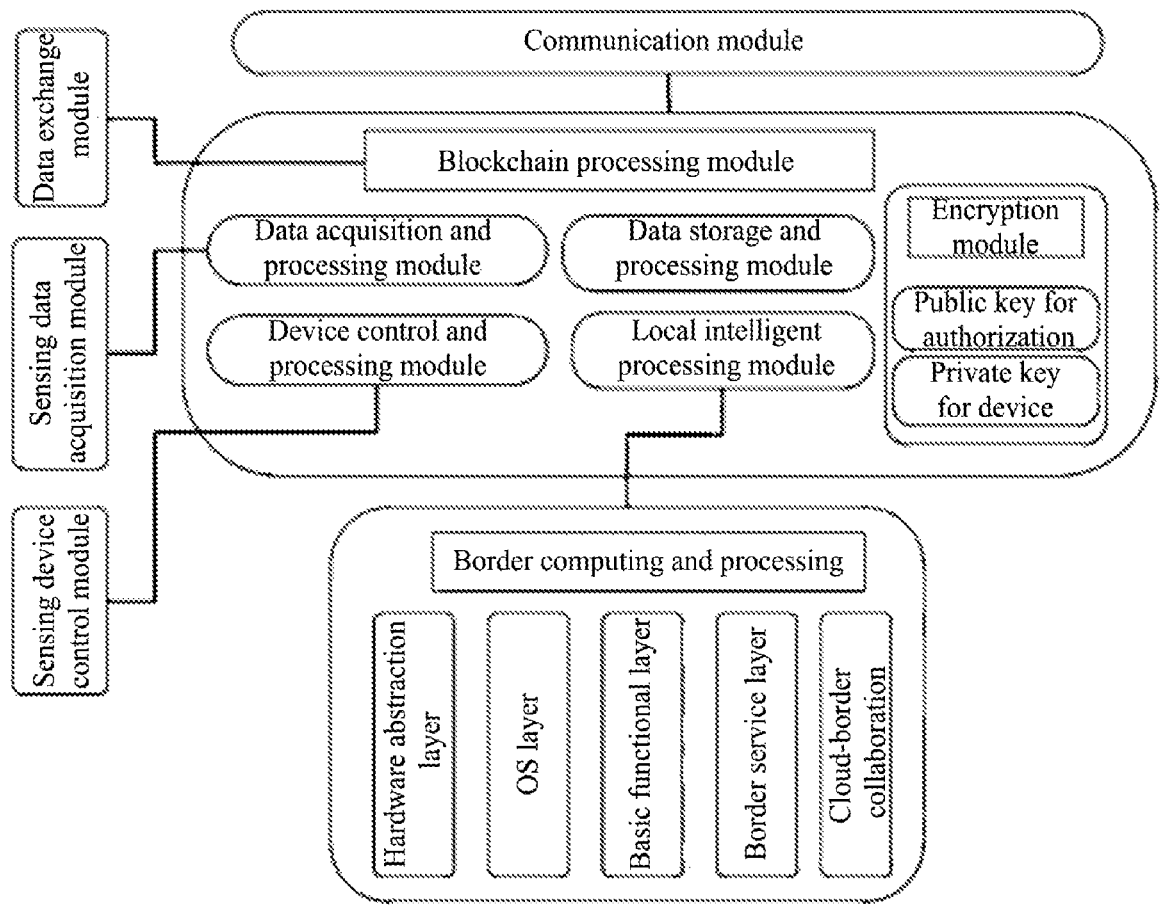
FIG. 2 is a simple structure diagram of the electric border gateway.

The gateway device consists of a communication module (supporting multiple wired and wireless communication modes), a sensing data acquisition module, a data exchange module, a sensing device control module, a blockchain processing module (the connection relationship of specific units is not shown in drawings, and the blockchain processing module adopts the ARM processor), a border computing and processing module (GPU or CPU processor), and an power supply management module, etc. The device structure is as shown in FIG. 2.

Connection relationship among various modules in the device is: the communication module is directly connected with the blockchain processing module, and the blockchain processing module is directly connected with the sensing data acquisition module, the data exchange module, the sensing device control module, and the border computing and processing module, respectively.

Communication Data Flow Between Gateway and External Device

1) Firstly, the communication data sent by the external device to the gateway enters the blockchain processing module. The blockchain processing module enables functions such as external device security authentication and communication data decryption, etc., and then, according to the data type, the blockchain forwards the data to the sensing data acquisition module, the data exchange module and the sensing device control module or the border computing and processing module for further processing;

2) When the data processed by the sensing data acquisition module, the data exchange module, and the sensing device control module/border computing and processing module are ready to be sent to other devices, the data are first sent to the blockchain processing module for data encryption and signature authentication before being transmitted to the communication module and then to the designated external device.

Functions of all Component Modules of Gateway

Data exchange module: the data exchange module is in charge of the data interaction with all other modules, which may dock a RPC (remote procedure call) on the main chain of the blockchain and an API (application program interface) of the IoT device.

Sensing data acquisition module: the sensing data acquisition module may collect information of sensing terminal devices such as cameras, GPSs, and sensors, and the collected data may be incorporated into the device application.

Sensing device control module: it is a control module of the IoT device, which may receive control instructions sent by the device and perform corresponding operations, such as switching, unlocking, and powering on of the coordinated control.

Blockchain processing module: the blockchain processing section includes a data acquisition and processing unit, a device control and processing unit, a local intelligent processing unit, a data storage and processing unit, and an encryption module. Specific functional architecture diagram is as shown in FIG. 2.

The data acquisition and processing unit is used for data encryption or decryption of the data transmitted by the sensing data acquisition module.

The device control and processing unit is used for device authentication, device signature and other control processes of external access devices or control output devices.

The local intelligent processing unit is used to enable data fusion processing such as data filtering and data classification for locally collected data. If the data needs further advanced processing, the data processed in this section will be directly transmitted to the border computing and processing module for border computing and processing.

The data storage and processing unit is used for enabling data storage by adopting a blockchain hyperledger structure.

The encryption module is a core module used for implementing the device blockchain functions, in which private keys and data specific to the device are stored and public keys of all authorized users are saved, with the public keys being stored in the encryption storage medium through the encryption chip. This module is in charge of all related data signatures, data encryption and signature verification.

Figure 3:
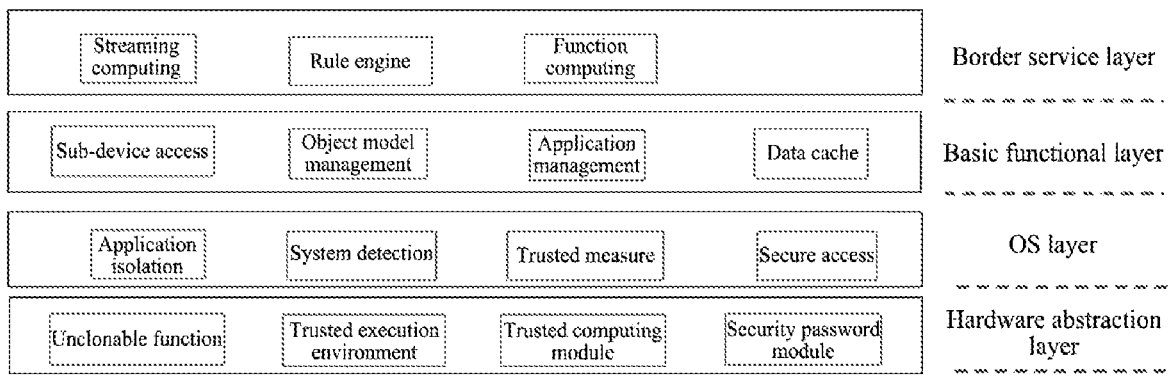
FIG. 3 is a functional structure diagram of the border gateway.

In the term of functional structure, the border computing and processing module is composed of a hardware abstraction layer, an operating system layer, a basic functional layer and a border service layer, as shown in FIG. 3; wherein, the hardware layer includes a unique identification of the device and a trusted computing module, the operating system layer includes functions such as system monitoring, secure access, application isolation, and trusted measure; the basic functional layer includes functions such as sub-device access, object model management, and message queue, which supports system management through system APP applications and realizes a border computing framework; the border service layer includes functions such as streaming computing and rule engine, and supports cloud-border collaboration of resources, data, intelligence, application management, and the like.

3, Blockchain Work Flow 3.1 Blockchain Authentication Method

The authentication method of the electric sensing terminal proposed in this scheme is mainly based on the digital signature algorithm, hash algorithm and blockchain technology; wherein, the significance of introducing digital signature and hash algorithm is to verify the signature of data messages between devices and ensure the integrity and non-repudiation of the data messages, while the significance of introducing blockchain technology is to store, in the form of blockchain transactions, the critical data information contained in the identity authentication mechanism into the distributed ledger maintained by multiple blockchain nodes, so as to ensure the tamper proof and traceability of the data information, thereby finally enabling decentralized authentication.

3.2 Process of Reporting and Authentication for Chaining Data Collected by Sensing Device Every time the sensing device collects the obtained electric data, it uses its private key to encrypt the collected data by Keccak algorithm, then uses ECDSA algorithm to sign the encrypted electric sensing data, and forms a block by adding a hash value of the encrypted data to apply for chaining. The authentication architecture is as shown in FIG. 3, and specific authentication process is as follows:

Communication Encryption Method of Electric Sensing Data

The specific communication encryption process is as follows:

In Step 1: after collecting various kinds of data, according to a sensing network communication protocol, the electric sensing device generates a data package to be sent to the upper layer;

In Step 2: the device encrypts the sensing data by adopting Keccak encryption algorithm to obtain the ciphertext;

In Step 3: the device generates a signature and a hash value for the ciphertext;

In Step 4: the encrypted ciphertext, hash value, and timestamp generated by data are reported to the master node device in the region: the border gateway;

In Step 5: other slave nodes in the blockchain (electric sensing devices) perform signature verification and hash value verification on the data: the collected data is true and valid if the signature and the value are proved true; and if not, the data is discarded and a new round of collection starts.

Encryption Method of Electric Sensing Data Signature

ECDSA algorithm, which is an elliptic curve digital signature algorithm, uses the elliptic curve cryptography (ECC) to simulate the digital signature algorithm (DSA). The implementation process of ECDSA signature algorithm includes 4 steps as follows: domain parameter selection, key pair generation, signature generation and signature verification.

1. Domain parameters are composed of various parameters on the elliptic curve.

2. Key pair generation: ECDSA key pair includes a public key PK-A and a private key SK-A;

3. Signature generation: a sender A signs the hash value H(m) of the message m by using the signature algorithm Sig relying on the private key SK-A, thereby generating a signature result SigSK-A(H(m)), and sends the signature result together with the message to a recipient B;

4. Signature verification: in order to verify the signature result of message m signed by the sender A, the recipient B needs to obtain domain parameters and the public key of A in advance for signature decryption verification. Generally, the signature verification process is completed by the recipient B of the message, who uses the verification algorithm Ver relying on the publich key PK-A to verify the signature result SigSK-A(H(m)), and the decrypted hash value H(m) is obtained, which is put into comparison with the hash value of the received message calculated by using the same hash function H. Tf the two values are equal, the verification is successful, indicating that the message is sent by A truly.

3.3 Sensing Data Chaining and Storage Process

After the sensing data passes the authentication, the master device (border gateway) functions to initiate and guide the consensus process, such as sorting the chaining requests. The master device is generally a border gateway with stronger computing performance but not taking the voting dominance in consensus, and the other nodes are the slave nodes. The data chaining and storage structure is as shown in FIG. 3.

In the node on the electric sensing data blockchain, only the border gateway is used as the master device for storing the aggregated electric sensing data ledger while other slave nodes, due to limitation by device resources, are involved only in the blockchain identity verification to verify the chaining application legality of the block, and adopt the PBFT consensus mechanism to synchronize the data to be chained into the electric sensing data blockchain. The specific steps are as follows:

In Step 1: After sorting and organizing the sensing data received from the chain, the master node generates a block, fills the data into the block, adds its own signature and hash of the block, and broadcasts the block to the electric sensing data blockchain network;

In Step 2: After receiving the new block from the master node, the slave node adds a block header contained in the block to a latest block ledger of its own (which means adding a block record), performs hash audit on the block, and broadcasts the verification result information to the electric sensing data block chain if the resultant hash is consistent with that sent by the master node;

In Step 3: each node also receives verification results from other nodes while verifying the block broadcast by the master node, deems the block to be valid after collecting messages confirming the correctness sent by more than half of all nodes, and submits the block to the locally owned ledger of the electric sensing data blockchain.

So far, all nodes have completed the ledger synchronization of electric sensing data. According to the present disclosure, the master device refers to a master node, the slave device refers to a slave node, and the node refers to a device which covers the master device and the slave device.

Embodiments of the present disclosure are described in detail as above. It is to be understood that those of ordinary skills in the art can make many modifications and changes according to the concept of the present disclosure without creative efforts. Therefore, all technical schemes that may be obtained by those skilled in the art through logical analysis, reasoning or limited experiments based on the prior art according to the idea of the present disclosure should fall within the protection scope determined by the claims.

What is claimed is:

1. A method for chaining and storage of sensing data of an electric border gateway device, wherein, in a device of an electric sensing data blockchain, only the border gateway device is used as a master device for storing an aggregated electric sensing data ledger while other slave devices are involved only in the blockchain identity verification to verify the chaining application legality of the block, and adopt a PBFT consensus mechanism to synchronize the data to be chained into the electric sensing data blockchain, including steps of:

(i) after sorting and organizing the sensing data received from the chain, using the master device to generate a block, fill data into the block, add a signature and hash to the block, and broadcast the block to the electric sensing data blockchain network;

(ii) after receiving a new block from the master device, a slave device adds a block header contained in the block to a latest block ledger of its own to add a block record, performs a hash audit on the block, and broadcasts a verification result information to the electric sensing data blockchain if the resultant hash is consistent with that sent by the master device;

(iii) transmitting verification results to each device from a plurality of nodes while verifying the block broadcast by a master node, deeming the block to be valid after collecting messages confirming the correctness sent by nodes of more than half of all slave devices, and submitting the block to a locally owned ledger of the electric sensing data blockchain; such that, all slave devices have completed the ledger synchronization of electric sensing data.

* * * * *